(12) United States Patent
Sarangapani et al.

(10) Patent No.: US 10,574,763 B2
(45) Date of Patent: Feb. 25, 2020

(54) SESSION-IDENTIFER BASED TWAMP DATA SESSION PROVISIONING IN COMPUTER NETWORKS

(71) Applicant: Juniper Networks, Inc., Sunnyvale, CA (US)

(72) Inventors: Srivathsa Sarangapani, Bangalore (IN); Kannan Loganathan, Chennai (IN); Kalyana Prakash Ravindranath Tagore, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 121 days.

(21) Appl. No.: 15/380,598

(22) Filed: Dec. 15, 2016

(65) Prior Publication Data

US 2018/0091603 A1 Mar. 29, 2018

(30) Foreign Application Priority Data

Sep. 29, 2016 (IN) .............................. 201641033262

(51) Int. Cl.
*G06F 15/173* (2006.01)
*H04L 29/08* (2006.01)
(Continued)

(52) U.S. Cl.
CPC ........ *H04L 67/142* (2013.01); *H04L 43/0864* (2013.01); *H04L 43/10* (2013.01);
(Continued)

(58) Field of Classification Search
CPC ... H04L 67/142; H04L 43/0864; H04L 43/10; H04L 43/50
(Continued)

(56) References Cited

U.S. PATENT DOCUMENTS 6,363,478 B1 3/2002 Lambert et al.
8,842,578 B1 9/2014 Zisapel et al.
(Continued)

FOREIGN PATENT DOCUMENTS

EP 2629477 A1 * 8/2013 ......... H04L 65/1069
EP 2690824 A1 1/2014
(Continued)

OTHER PUBLICATIONS

K. Hedayat, R. Krzanowski, A. Morton, K. Yum, J. Babiarz, A Two-Way Active Measurement Protocol (TWAMP), Oct. 2008, Network Working Group, pp. 1-26 (Year: 2008).*
(Continued)

*Primary Examiner* — Liang Che A Wang
*Assistant Examiner* — Kaylee J Huang
(74) *Attorney, Agent, or Firm* — Shumaker & Sieffert, P.A.

(57) ABSTRACT

Techniques are described for performing session identifier ("SID") based two-way active measurement protocol (TWAMP) data session provisioning between two endpoints in a computer network. According to the techniques, a SID assigned to each data session is used to uniquely identify the data session, instead of a source and destination address/port pairs. A TWAMP server may generate a unique number as a SID of a data session during negotiation of the data session. The disclosed techniques include extending TWAMP control messaging to include a communication mode for the SID-based TWAMP data session provisioning. The disclosed techniques further include extending TWAMP data messaging to include the SID of the data session in each test packet for the data session. In this way, a TWAMP session sender and a TWAMP session reflector may associate received test packets with a certain data session based on the SID included in the received test packets.

20 Claims, 8 Drawing Sheets

(51) Int. Cl.
*H04L 12/26* (2006.01)
*H04L 29/06* (2006.01)

(52) U.S. Cl.
CPC .............. *H04L 43/50* (2013.01); *H04L 67/10* (2013.01); *H04L 67/42* (2013.01)

(58) Field of Classification Search
USPC .................. 709/224, 223, 203, 218, 219
See application file for complete search history.

(56) References Cited

U.S. PATENT DOCUMENTS

| | | | |
|---|---|---|---|
| 8,843,738 | B2 | 9/2014 | Vos |
| 9,131,026 | B2 | 9/2015 | Hu et al. |
| 9,154,532 | B2 * | 10/2015 | Fernandez Gutierrez ................... G06Q 30/02 |
| 9,306,830 | B2 | 4/2016 | Robitaille |
| 9,419,883 | B2 | 8/2016 | Wallman et al. |
| 9,426,042 | B2 | 8/2016 | Park et al. |
| 9,485,165 | B2 * | 11/2016 | Allan ...................... H04L 43/10 |
| 9,531,621 | B2 | 12/2016 | Kölhi et al. |
| 9,563,900 | B1 * | 2/2017 | Guo .................. G06Q 30/0201 |
| 9,705,769 | B1 | 7/2017 | Sarangapani et al. |
| 9,923,796 | B2 | 3/2018 | Mirsky |
| 9,960,982 | B2 | 5/2018 | Nydell |
| 9,998,565 | B2 | 6/2018 | Gupta et al. |
| 10,021,216 | B2 | 7/2018 | Gupta et al. |
| 10,063,449 | B2 | 8/2018 | Mirsky et al. |
| 10,110,455 | B2 | 10/2018 | Sarangapani et al. |
| 10,218,590 | B2 | 2/2019 | Gupta et al. |
| 2012/0128000 | A1 | 5/2012 | Baillargeon et al. |
| 2013/0138822 | A1 | 5/2013 | Hu et al. |
| 2013/0305036 | A1 | 11/2013 | Vos |
| 2014/0029441 | A1 | 1/2014 | Nydell |
| 2014/0029442 | A1 | 1/2014 | Wallman |
| 2014/0098679 | A1 | 4/2014 | Baillargeon |
| 2014/0119221 | A1 | 5/2014 | Park et al. |
| 2014/0169180 | A1 | 6/2014 | Wallman |
| 2014/0169183 | A1 | 6/2014 | Allan et al. |
| 2014/0226505 | A1 | 8/2014 | Sadek |
| 2014/0226507 | A1 * | 8/2014 | Bonnier .................. H04L 43/08 370/252 |
| 2015/0058479 | A1 * | 2/2015 | Kolhi .................. H04L 43/0811 709/224 |
| 2015/0109952 | A1 | 4/2015 | Baillargeon et al. |
| 2015/0333993 | A1 | 11/2015 | Welin et al. |
| 2016/0014213 | A1 * | 1/2016 | Ajitomi ................... H04L 67/02 709/228 |
| 2016/0026490 | A1 | 1/2016 | Johnsson et al. |
| 2016/0028603 | A1 | 1/2016 | Chakrabarti et al. |
| 2016/0028604 | A1 | 1/2016 | Chakrabarti et al. |
| 2016/0073279 | A1 | 3/2016 | Johnsson et al. |
| 2016/0191367 | A1 | 6/2016 | Mirsky et al. |
| 2016/0191632 | A1 | 6/2016 | Mirsky et al. |
| 2016/0248656 | A1 | 8/2016 | Anand et al. |
| 2016/0330092 | A1 | 11/2016 | Wallman |
| 2016/0352865 | A1 | 12/2016 | Gupta et al. |
| 2016/0352866 | A1 | 12/2016 | Gupta et al. |
| 2017/0019323 | A1 | 1/2017 | Allan et al. |
| 2017/0289011 | A1 | 10/2017 | Johnsson et al. |
| 2017/0373950 | A1 | 12/2017 | Szilagyi et al. |
| 2018/0077032 | A1 | 3/2018 | Park et al. |
| 2018/0091603 | A1 | 3/2018 | Sarangapani et al. |
| 2018/0107577 | A1 | 4/2018 | Johnsson et al. |
| 2018/0167294 | A1 | 6/2018 | Gupta et al. |
| 2018/0219758 | A1 | 8/2018 | Nydell |
| 2018/0288194 | A1 | 10/2018 | Gupta et al. |

FOREIGN PATENT DOCUMENTS

| | | |
|---|---|---|
| EP | 2765740 A1 | 8/2014 |
| EP | 3099016 A1 | 11/2016 |
| WO | 2013184846 A1 | 12/2013 |
| WO | 2014168530 A1 | 10/2014 |

OTHER PUBLICATIONS

Hedayat et al., "A Two-Way Active Measurement Protocol (TWAMP)," Network Working Group, RFC 5357, Oct. 2008, 26 pp.
Shalunov et al., "A One-Way Active Measurement Protocol (OWAMP)," Network Working Group, RFC 4656, Sep. 2006, 56 pp.
Mirsky et al., "UDP Port Allocation for the Receiver Port in Two-Way Active Measurement Protocol (TWAMP)," Network Working Group, Internet-Draft, Updates 5357, Jun. 14, 2016, 5 pp.
Perumal et al., "Network Address Translator (NAT) Considerations for IP Performance Metrics (IPPM) Active Measurement Protocols," Network Working Group, Internet-Draft, Jul. 6, 2016, 7 pp.
U.S. Appl. No. 14/573,167, filed Dec. 17, 2014, 64 pp.
U.S. Appl. No. 15/376,617, by Juniper Networks Inc., (Inventors: Gupta et al.), filed Dec. 12, 2016.

* cited by examiner

SESSION-IDENTIFER BASED TWAMP DATA SESSION PROVISIONING IN COMPUTER NETWORKS

This application claims the benefit of Indian Provisional Patent Application No. 201641033262, filed on Sep. 29, 2016, the entire content of which is incorporated herein by reference.

TECHNICAL FIELD

The disclosure relates to computer networks.

BACKGROUND

A computer network is a collection of interconnected network devices that can exchange data and share resources. A One-Way Active Measurement Protocol (OWAMP) may be used to measure one-way metrics of network performance between two network devices. OWAMP can be used bi-directionally to measure one-way metrics in both directions between the two network devices, but OWAMP does not accommodate two-way or round trip measurements. A Two-Way Active Measurement Protocol (TWAMP) is based on OWAMP and adds the ability to measure two-way or round trip metrics of network performance between the two network devices. For example, TWAMP may be used to measure both two-way and one-way network performance indicators, such as path connectivity, path delay, packet jitter, packet loss, packet re-ordering, and the like.

A TWAMP measurement architecture includes at least two network devices, also referred to as hosts or endpoints, that each support TWAMP and perform specific roles to start data sessions and exchange test packets over the data sessions. TWAMP control messaging, used to initiate, start, and stop data sessions, occurs between a TWAMP control client and a TWAMP server. TWAMP data or test messaging, used to exchange test packets in order to measure network performance, occurs between a TWAMP session sender and a TWAMP session reflector. In an example network architecture, the logical roles of the TWAMP control client and the TWAMP session sender may both be executed by a first endpoint, and the logical roles of the TWAMP server and the TWAMP session reflector may both be executed by a second endpoint. In other example architectures, each of the logical roles may be executed on a different host. In still other example architectures, the TWAMP control client may be executed by a Software-Defined Network (SDN) controller that acts as a distributed control plane for the first and second endpoints.

SUMMARY

In general, this disclosure is directed to techniques for performing session identifier ("SID")-based two-way active measurement protocol (TWAMP) data session provisioning between two endpoints in a computer network. The disclosed techniques include extending TWAMP control messaging to include a communication mode for the SID-based TWAMP data session provisioning. If the communication mode is supported by both endpoints, a SID is assigned to uniquely identify a data session being provisioned or negotiated over the control session. The disclosed techniques further include extending TWAMP data messaging to include the SID of the data session in each test packet for the data session. In this way, each of the endpoints may identify a data session corresponding to one or more received TWAMP test packets based on the SID included in the received TWAMP test packets.

In one example, this disclosure is directed to a method comprising establishing a control connection between a TWAMP control client and a TWAMP server; negotiating, by the TWAMP control client and the TWAMP server over the control connection, a data session between a TWAMP session sender executed on a first network device and a TWAMP session reflector executed on a second network device, wherein negotiating the data session includes exchanging a SID assigned by the TWAMP server to identify the data session; and exchanging one or more TWAMP test packets for the data session between the TWAMP session sender and the TWAMP session reflector, each of the one or more TWAMP test packets including the SID of the data session.

In another example, this disclosure is directed to a network device comprising a memory, and one or more processors in communication with the memory. The one or more processors execute a TWAMP control client and a TWAMP session sender and are configured to establish a control connection between the TWAMP control client and a TWAMP server; and negotiate, over the control connection, a data session between the TWAMP session sender and a TWAMP session reflector executed on another network device, wherein, to negotiate the data session, the one or more processors are configured to exchange a SID assigned by the TWAMP server to identify the data session. The one or more processors are further configured to send one or more TWAMP test packets for the data session from the TWAMP session sender to the TWAMP session reflector, each of the one or more TWAMP test packets including the SID of the data session; receive the one or more TWAMP test packets back from the TWAMP session reflector, each of the one or more TWAMP test packets including the SID of the data session and at least one metric for the data session used to measure network performance between the network device and the another network device; and associate the one or more TWAMP test packets with the data session based on the SID included in the one or more TWAMP test packets.

In an additional example, this disclosure is directed to a network device comprising a memory, and one or more processors in communication with the memory. The one or more processors execute a TWAMP server and a TWAMP session reflector and are configured to establish a control connection between the TWAMP server and a TWAMP control client; and negotiate, over the control connection, a data session between the TWAMP session reflector and a TWAMP session sender executed on another network device, wherein, to negotiate the data session, the one or more processors are configured to exchange a SID assigned by the TWAMP server to identify the data session. The one or more processors are further configured to receive one or more TWAMP test packets for the data session by the TWAMP session reflector from the TWAMP session sender, each of the one or more TWAMP test packets including the SID of the data session; identify the data session of the one or more TWAMP test packets based on the SID included in the one or more TWAMP test packets; and send the one or more TWAMP test packets from the TWAMP session reflector back to the TWAMP session sender, each of the one or more TWAMP test packets including the SID of the data session and at least one metric for the data session used to measure network performance between the network device and the another network device.

The details of one or more examples are set forth in the accompanying drawings and the description below. Other features, objects, and advantages will be apparent from the description and drawings, and from the claims.

DETAILED DESCRIPTION

Figure 1:
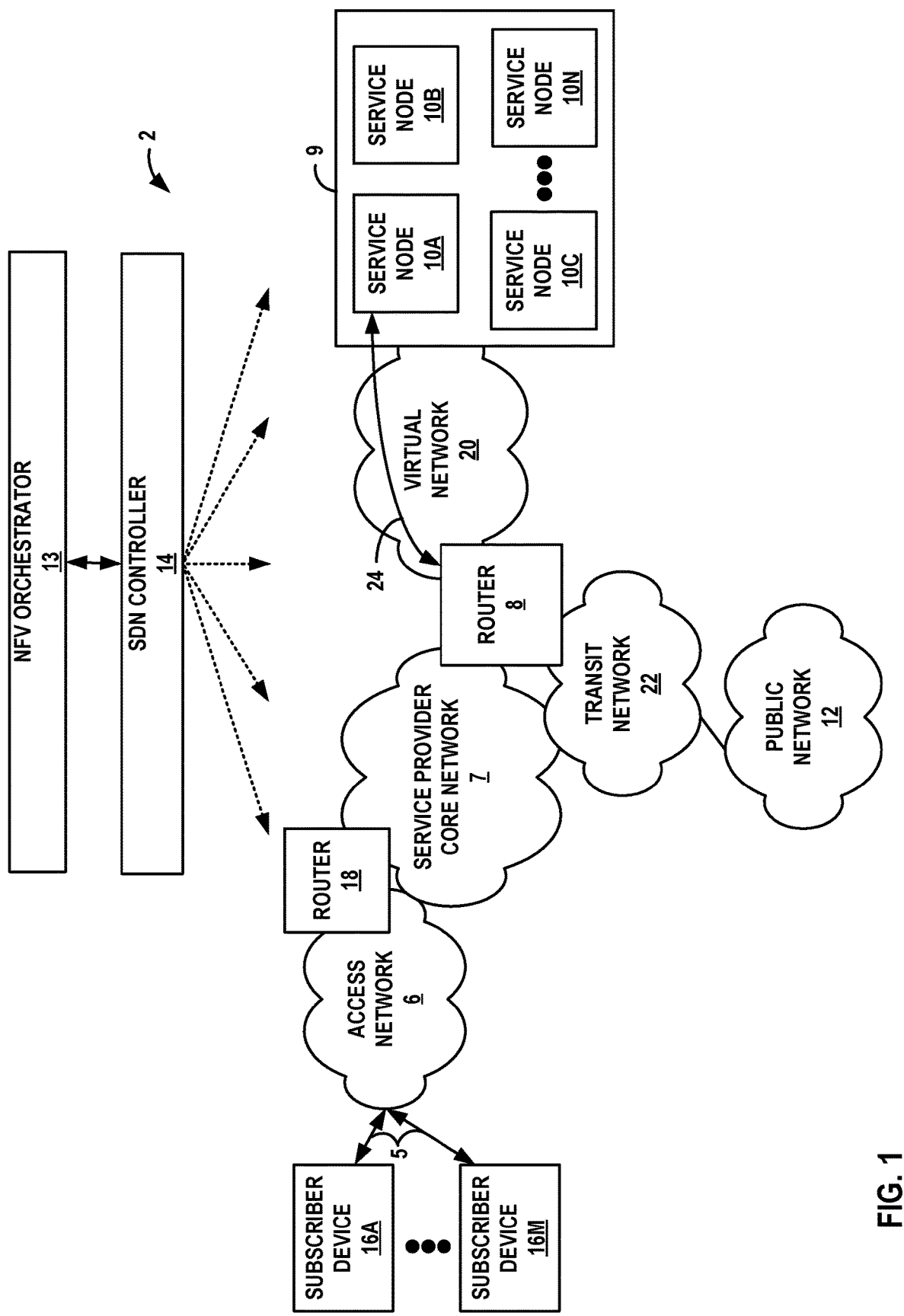
FIG. 1 is a block diagram illustrating an example network system including a software defined network (SDN) network and network function virtualization (NFV) based network architecture, in accordance with the techniques of this disclosure.

FIG. 1 is a block diagram illustrating an example network system including a software defined network (SDN) network and network function virtualization (NFV) based network architecture, in accordance with techniques described herein. The example network system of FIG. 1 includes a service provider network 2 that operates as a private network to provide packet-based network services to subscriber devices 16A-16M (collectively "subscriber devices 16"). That is, service provider network 2 provides authentication and establishment of network access for subscriber devices 16 such that a subscriber device may begin exchanging data packets with public network 12, which may be an internal or external packet-based network such as the Internet.

As illustrated in FIG. 1, service provider network 2 comprises a software defined network (SDN) and network functions virtualization (NFV) architecture. SDN controller device 14 may provide a high-level controller for configuring and managing the routing and switching infrastructure of service provider network 2. NFV orchestrator device 13 may provide a high-level orchestrator for configuring and managing virtualization of network services into service nodes 10A-10N (collectively "service nodes 10") of data center 9.

In some instances, SDN controller 14 manages deployment of virtual machines (VMs) within the operating environment of data center 9. For example, SDN controller 14 may interact with provider edge (PE) router 8 to specify service chain information, described in more detail below.

For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

In the example of FIG. 1, service provider network 2 comprises access network 6 that provides connectivity to public network 12 via service provider core network 7 (hereinafter, "core network 7") and router 8. Core network 7 and public network 12 provide packet-based services that are available for request and use by subscriber devices 16. As examples, core network 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

Subscriber devices 16 can connect to router 8 via access network 6 to receive connectivity to subscriber services for applications hosted by service nodes 10. A subscriber may represent, for instance, an enterprise, a residential subscriber, or a mobile subscriber. Subscriber devices 16 may be, for example, personal computers, laptop computers or other types of computing devices associated with subscribers. In addition, subscriber devices 16 may comprise mobile devices that access the data services of service provider network 2 via a radio access network (RAN) (not shown). Example mobile subscriber devices include mobile telephones, laptop or desktop computers having, e.g., a 3G wireless card, wireless-capable netbooks, video game devices, pagers, smart phones, personal data assistants (PDAs) or the like.

Each of subscriber devices 16 may run a variety of software applications, such as word processing and other office support software, web browsing software, software to support voice calls, video games, video conferencing, and email, among others. Subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric digital subscriber line (DSL) network, a Worldwide Interoperability for Microwave Access (WiMAX) network, a T-1 line, an Integrated Service Digital Network (ISDN), wired Ethernet, or a cellular radio link.

A network service provider operates, or in some cases leases, elements of access network 6 to provide packet transport between subscriber devices 16 and router 8. Access network 6 represents a network that aggregates data traffic from one or more of subscriber devices 16 for transport to/from core network 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Router 18 may be a customer edge (CE) router, a provider edge (PE) router, or other network device between access network 6 and core network 7. Core network 7 offers packet-based connectivity to subscriber devices 16 attached to access network 6 for accessing public network 12 (e.g., the Internet). Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent the Internet. Public network 12 may represent an edge network coupled to core network 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to access network 6, core network 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as router 18 or router 8. In turn, router 18 may access a central server (not shown) such as an Authentication, Authorization and Accounting (AAA) server to authenticate the one of subscriber devices 16 requesting network access. Once authenticated, any of subscriber devices 16 may send subscriber data traffic toward core network 7 in order to access and receive services provided by public network 12, and such packets may traverse router 8 as part of at least one packet flow. In some examples, router 18 may forward all authenticated subscriber traffic to public network 12, and router 8 may steer particular subscriber traffic to a data center 9 if the subscriber traffic requires services on service nodes 10. Applications (e.g., service applications) to be applied to the subscriber traffic may be hosted on service nodes 10.

As described herein, service provider network 2 includes a data center 9 having a cluster of service nodes 10 that provide an execution environment for the mostly virtualized network services. In some examples, each of service nodes 10 represents a service instance. Each of service nodes 10 may apply one or more services. As examples, service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

Although illustrated as part of data center 9, service nodes 10 may be network devices coupled by one or more switches or virtual switches of core network 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

Router 8 may steer individual subscriber packet flows through defined sets of services provided by service nodes 10. That is, in some examples, each subscriber packet flow may be forwarded through a particular ordered combination of services provided by service nodes 10, each ordered set being referred to herein as a "service chain." In the example of FIG. 1, subscriber packet flows may be directed along a service chain that includes any of service nodes 10. A particular service node 10 may support multiple service chains. Once processed at a terminal node of the service chain, i.e., the last service node 10 to apply services to packets flowing along a particular service path, the terminal node may direct the traffic back to router 8 for further processing and/or forwarding to public network 12. For example, traffic engineered service paths may start and terminate with router 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after router 18 has authenticated and established access sessions for the subscribers, router 18 or router 8 may direct packet flows for the subscribers along the appropriate service tunnels, thereby causing data center 9 to apply the requisite ordered services for the given subscriber. In some examples, SDN controller 14 may also provide a forwarding rule set to router 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

A two-way active measurement protocol (TWAMP) may be used within service provider network 2 to measure both one-way and two-way or round trip metrics of network performance between network devices, also referred to as hosts or endpoints. A TWAMP measurement architecture includes at least two network devices that each support TWAMP and perform specific roles to start data sessions and exchange test packets for the data sessions. In the example network architecture illustrated in FIG. 1, TWAMP may be used to measure network performance between router 8 and one of service nodes 10, e.g., service node 10A, for certain network services. In this example, the logical roles of a TWAMP control client and a TWAMP session sender are both performed by router 8, and the logical roles of a TWAMP server and a TWAMP session reflector are both performed by service node 10A.

In alternative TWAMP architectures, each of the logical roles may be executed on a different host or endpoint. In still other example architectures, the TWAMP control client may be executed on SDN controller 14 that acts as a distributed control plane for the first and second endpoints, e.g., router 8 and service node 10A. Although described herein with respect to measuring network performance for network services, TWAMP may also be applied to measure network performance unrelated to network services between any two endpoints, e.g., router 18 and router 8.

The TWAMP control client executed on router 8 and the TWAMP server executed on service node 10A establish a control connection and use TWAMP control messaging to initiate, start, and stop data session 24. Once data session 24 is established, the TWAMP session sender executed on router 8 and the TWAMP session reflector executed on service node 10A use TWAMP data messaging to exchange test packets for data session 24 that carry one or more metrics used to measure network performance between router 8 and service node 10A. Although only one data session 24 is illustrated in the example of FIG. 1, in other examples, multiple data session may be established between the two TWAMP enabled endpoints. In some examples, each of the multiple data sessions may be associated with a different network performance metric. In other examples, each of the multiple data sessions may be associated with a different network service provided by service node 10A.

In some examples, the metrics carried by TWAMP test packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

TWAMP is described in more detail in RFC 5357 (Hedayat, et al., "A Two-Way Active Measurement Protocol (TWAMP)," Internet Engineering Task Force (IETF), Network Working Group, RFC 5357, October 2008), the entire content of which is incorporated herein by reference. TWAMP is based on one-way active measurement protocol (OWAMP), which may be used to measure one-way metrics of network performance between network devices. OWAMP is described in more detail in RFC 4656 (Shalunov, et al., "A One-Way Active Measurement Protocol (OWAMP)," Internet Engineering Task Force (IETF), Network Working Group, RFC 4656, September 2006), the entire content of which is incorporated herein by reference.

Extensions to TWAMP to operate within a SDN and NFV architecture, in which a TWAMP control client is executed on a SDN controller, are described in more detail in U.S. application Ser. No. 14/755,961, filed Jun. 30, 2015, the entire content of which is incorporated herein by reference. Extensions to TWAMP to support selection and measurement of service key performance indicators (KPIs) are described in more detail in U.S. application Ser. No. 14/755,986, filed Jun. 30, 2015, the entire content of which is incorporated herein by reference. Techniques for performing service latency measurements using TWAMP is described in more detail in U.S. application Ser. No. 14/573,167, filed Dec. 17, 2014, the entire content of which is incorporated herein by reference.

Conventionally, a TWAMP data session is identified based on a five-tuple of the data session between the first and second endpoints. The five-tuple of the data session includes a source IP address, a source port, a destination IP address, a destination port, and a protocol in use. Using the five-tuple to identify TWAMP data sessions may create several issues. As one example, a TWAMP data session may traverse a network that implements source network address translation (NAT) such that the source address and source port of the TWAMP control messages and TWAMP data messages are translated to a new address and a new port. In this case, the TWAMP session reflector may be unable to associate received TWAMP test packets having translated source information with an established data session. As another example, for multiple different data sessions established between the same two endpoints, the source port and destination port are the only unique pieces of information included in the five-tuple to differentiate between the data sessions. The number of data sessions that can be established between the same two endpoints is, therefore, limited by the number of ports the endpoints have available because each of the data sessions requires a unique source and destination port.

The techniques described in this disclosure include session identifier ("SID") based TWAMP data session provisioning between two endpoints in a computer network. According to the techniques, a SID assigned to each data session is used to uniquely identify the data session, instead of the source and destination address/port pairs of the five-tuple. In the example of FIG. 1, during negotiation of data session 24, the TWAMP server executed on service node 10A is configured to generate a unique number to be used as the SID of data session 24. Once data session 24 is established, both the TWAMP session sender executed on router 8 and the TWAMP session reflector executed on service node 10A include the SID in each TWAMP test packet to identify the associated data session 24.

The disclosed techniques include extending TWAMP control messaging to include a communication mode for the SID-based TWAMP data session provisioning. In this way, support for SID-based TWAMP data session provisioning may be negotiated by the TWAMP control client executed on router 8 and the TWAMP server executed on service node 10A during establishment of the control connection. The disclosed techniques further include extending TWAMP data messaging to include the SID of the data session in each test packet for the data session. In this way, the TWAMP session sender executed on router 8 and the TWAMP session reflector executed on service node 10A may associate received test packets with data session 24 based on the SID included in the received test packets.

The disclosed techniques may overcome the above described issues that may be faced by TWAMP data sessions that traverse one or more networks to measure network performance between two endpoints. For example, using SIDS, instead of source address/port pairs, to identify data sessions associated with received TWAMP test packets enables TWAMP to be used in source NATTED environments in which source addresses and source ports of packets may be translated to new addresses and new ports. As another example, using SIDS to identify data sessions avoids the need for unique source and destination ports for each of the data sessions, and enables TWAMP to be used in environments with high-scale data session requirements.

Figure 2:
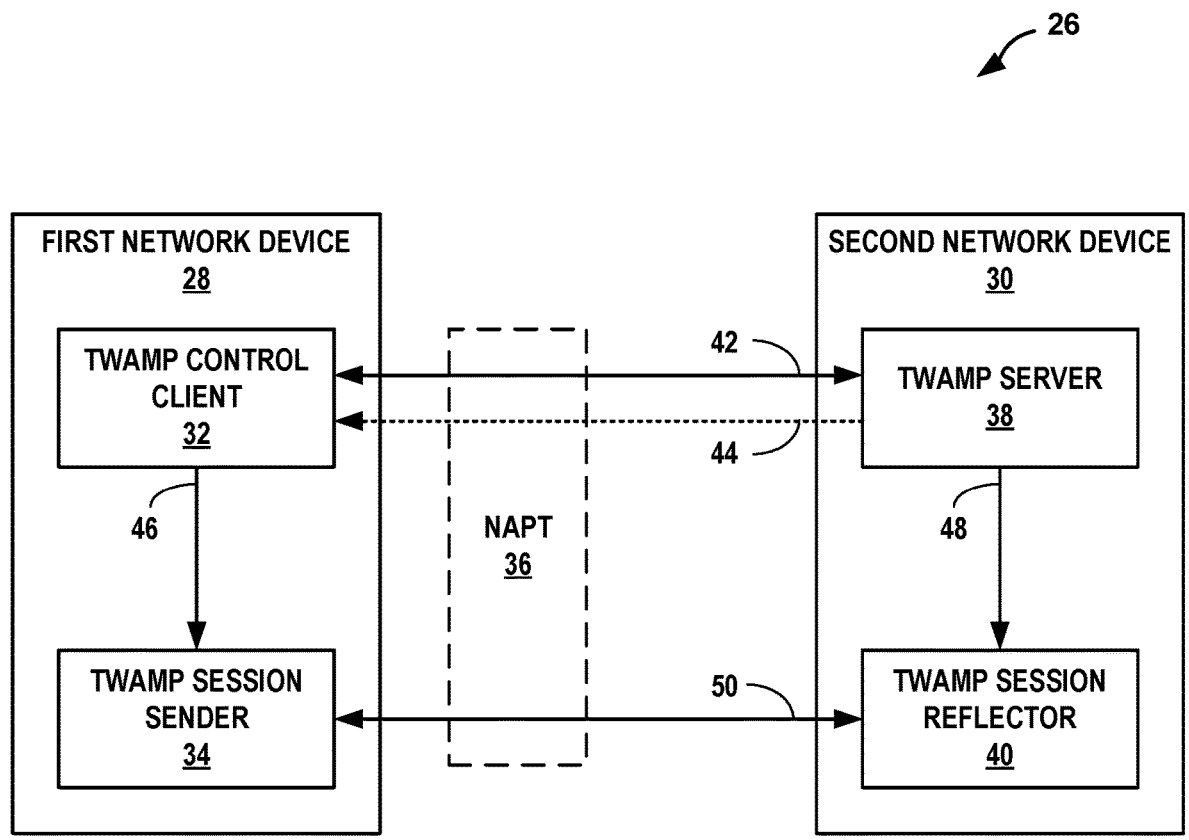
FIG. 2 is a block diagram illustrating an example TWAMP architecture including network devices configured to perform SID-based TWAMP data session provisioning, in accordance with the techniques of this disclosure.

FIG. 2 is a block diagram illustrating an example TWAMP architecture 26 including network devices configured to perform SID-based TWAMP data session provisioning, in accordance with the techniques of this disclosure. TWAMP architecture 26 includes a first network device 28 and a second network device 30. Each of first network device 28 and second network device 30 may comprise a router, e.g., router 8 or router 18 from FIG. 1, a switch, or another network device within data center 9 that is configured to execute one of service nodes 10.

In the illustrated example of FIG. 2, first network device 28 is configured to execute both a TWAMP control client 32 and a TWAMP session sender 34, and second network device 30 is configured to execute a TWAMP server 38 and a TWAMP session-reflector 40. TWAMP control client 32 and TWAMP session sender 34 may be connected via a communication link 46. In the illustrated example where TWAMP control client 32 and TWAMP session sender 34 are executed on the same host, communication link 46 may comprise an internal communication link. In other examples, where TWAMP control client 32 and TWAMP session sender 34 are executed on different hosts, communication link 46 may comprise an external communication link. Similarly, TWAMP server 38 and TWAMP session reflector 40 may be connected via a communication link 48. In some examples, the different TWAMP logical roles or entities may communicate over either of communication links 46, 48 using an Extensible Messaging and Presence Protocol (XMPP) interface or any other proprietary communication protocol.

In accordance with the techniques of this disclosure, first network device 28 and second network device 30 may be configured to perform SID-based TWAMP data session provisioning. In the example illustrated in FIG. 2, TWAMP control client 32 and TWAMP server 38 establish control connection 42. Control connection 42 may comprise a Transmission Control Protocol (TCP) connection such that subsequent control messages transmitted over control connection 42 comprise TCP packets. TWAMP control client 32 and TWAMP server 38 exchange control message over control connection 42 to negotiate data session 50 between TWAMP session sender 34 and TWAMP session reflector 40. As part of the negotiation process for data session 50, TWAMP control client 32 and TWAMP server 38 perform an exchange 44 of a SID that uniquely identifies data session 50.

Once TWAMP control client 32 starts data session 50, TWAMP session sender 34 sends TWAMP test packets for data session 50 that include the SID to TWAMP session reflector 40. TWAMP session reflector 40 uses the SID included in the TWAMP test packets received from TWAMP session sender 34 to identify data session 50 corresponding to the TWAMP test packets. TWAMP session reflector 40 then sends the TWAMP test packets back to TWAMP session sender 34 including the SID and one or more metrics for data session 50. Upon receipt, TWAMP session sender 34 associates the TWAMP test packets with data session 50 based on the SID included in the TWAMP test packets. TWAMP control client 32, or some other module executed by first network device 28, may use the received metrics to compute the network performance measurements between first network device 28 and second network device 30.

As described above, conventionally, a TWAMP data session is identified based on a five-tuple of the data session between the first and second endpoints. The five-tuple of the data session includes a source IP address, a source port, a destination IP address, a destination port, and a protocol in use. Using the five-tuple to identify TWAMP data sessions, however, may create several issues, which are described in more detail below.

As a first issue, TWAMP control connection 42 and data session 50 may traverse one or more networks that include source Network Address Translation (NAT) implementations, such as NAPT (Network Address Port Translation) 36. In this case, NAPT 36 translates the source address and the source port for the TWAMP control messages as well as the TWAMP data sessions to a new address and a new port. The source address and source port translation may create ambiguity with respect to session identification. The issue that arises from the source address and source port translation is illustrated by the following example sequence of events.

(1) When TWAMP control messages pass through NAPT 36, the source IP address and source port for TWAMP control connection 42 are translated, e.g., from an original IP address of 'X' to an IP address of 'Y' and from an original port number of 'X1' to a port number of 'Y1'. TWAMP control client 32, therefore, sends control messages over control connection 42 from IP address X and port number X1, but the translated control messages create an image in TWAMP server 38 that TWAMP control client 32 is associated with IP address Y and port number Y1.

(2) When TWAMP control client 32 sends a request session message to TWAMP server 38 during negotiation of data session 50, TWAMP control client 32 embeds the original source IP address and port number in the TCP payload of the control message. Conventionally, the embedded details of the source IP address and port number are used to identify the data session on which TWAMP session sender 34 will send TWAMP test packets. TWAMP control client 32 then sends the control message across the NATTED environment (e.g., through NAPT 36) such that the original source IP address and port number of the control message itself is translated, but the original source IP address and port number embedded in the payload of the control message are not translated.

(3) As a result, TWAMP session-reflector 40 expects to receive the TWAMP test packets on a data session associated with the original source IP address and port number indicted in the payload of the control message. Due to the NATTED environment, however, the original source IP address and port number of any TWAMP test packets sent by TWAMP session sender 34 will be translated by NAPT 36 such that TWAMP session reflector 40 will not receive any TWAMP test packets on a data session corresponding to the original source IP address and port number, as expected. In this case, TWAMP session reflector 40 may keep waiting for the data session identified by the original source IP address and port number combination indicated in the payload, whereas the actual test session would arise from some other translated source IP address and port number combination.

The techniques of this disclosure are directed to the introduction of a SID that uniquely identifies each data session. The disclosed techniques provide a solution to the above described first issue by enabling the endpoints, e.g., first network device 28 and second network device 30, to authenticate the data sessions based on the SID instead of a source IP address and port number combination. As discussed in further detail below, TWAMP server 38 may be configured to generate the SID of a data session, e.g., data session 50, during data session negotiation between TWAMP control client 32 and TWAMP server 38 over control connection 34. Once data session 50 is established with the corresponding SID TWAMP session sender 34 and TWAMP session reflector 40 include the SID in each TWAMP test packet for data session 50.

As a second issue, conventionally with TWAMP, a data session can be identified only by using the five-tuple of the data session between the first and second endpoints, e.g., first network device 28 or second network device 30. The five-tuple includes a source IP address (SIP), destination IP address (DIP), source port (SP), destination port (DP), and protocol in use. In the five-tuple, the SIP, DIP, and protocol are the same for all the data sessions between the same two endpoints, and only the source port and destination port are different. Only the SP and DP, therefore, are used to differentiate between multiple data sessions between the same two endpoints. In the case where the TWAMP control client and the TWAMP server are from different vendors, may not be able to assume that the other vendors will always return a new port number. Hence, conventionally, the TWAMP control client and TWAMP server must always create a new port number for each data session, otherwise they may not be able to associate the test packets with a particular data session.

As an example, a standard endpoint, e.g., first network device 28 or second network device 30, may include 65,000 available ports within 5,000 of those ports being ephemeral ports that cannot be used for TWAMP connections. Assuming one control connection and one data session per TWAMP session between endpoint peers, 30,000 control connections and 30,000 data sessions can be achieved, for example. Theoretically, up to 59,999 data sessions are possible between endpoint peers with one control connection.

In one example TWAMP implementation, an enterprise customer having a central office and 24,000 branch offices globally may determine whether all the branch office nodes are up and experiencing quality roundtrip time (RTT) using one port for a control connection and one port a data session per branch office (i.e., 48,000 ports). If, however, the customer wants two data sessions per branch office in order to see the behavior of a particular traffic class or a particular data size, the conventional TWAMP implementation cannot support the required 72,000 ports. In fact, the conventional TWAMP implementation cannot support more than 20,000 TWAMP sessions for the branch offices, with one port for control connection and two ports for data sessions per branch office (i.e., 60K ports).

The techniques of this disclosure are directed to the introduction of a SID that uniquely identifies each data session. The disclosed techniques provide a solution to the above described second issue by extending TWAMP such that each of the endpoints, e.g., first network device 28 and second network device 30, will include a SID of a data session as a part of the TWAMP test packets for that data session. Instead of using the five-tuple to identify and associate test packets for a particular data session, the SID is used to associate test packets with the appropriate corresponding data session. In this way, two endpoints can support up to 60,000 control connections and an infinite number of data sessions (assuming it is possible for the endpoints to generate an infinite number of unique SIDs). The techniques of this disclosure enable scalability within the limits of memory and central processing unit (CPU) constraints at the endpoints.

Apart from the above described issues, some additional issues with respect to unauthenticated sessions are also addressed as a result of introducing the SID. For example, introduction of the SID into TWAMP test packets answers the questions of (1) what device is sending what, and (2) what if there is another device sending a spam reply on behalf of TWAMP session reflector 40.

According to the disclosed techniques, TWAMP server 38 and/or TWAMP session reflector 40 maintains a data structure (e.g., a table) of a plurality of SIDs assigned to different data sessions. Upon receipt of a TWAMP test packet including a SID, TWAMP session reflector 40 may compare the SID to the table in order to identify the data session, e.g., data session 50, corresponding to the TWAMP test packet. In this way, TWAMP session reflector 40 may use the SID to authenticate the sender of data session 50, i.e., TWAMP session sender 34, and know which device is sending the test packets.

In addition, according to the disclosed techniques, TWAMP server 38 may periodically renegotiate the SID of data session 50 in order to avoid the scenario where another device may learn the SID and send spam reply test packets on behalf of TWAMP session reflector 40. For example, TWAMP server 38 may assign a new SID to identify data session 50 either after a set period of time or after a predetermined number of TWAMP test packets have been sent for data session 50. Periodically changing the SID of data session 50 may improve security and avoid "man-in-the-middle" attacks.

In one example, the SID is a new 16-bit field included in both the control messaging to establish the data session and in the test packets of the data session. As described above, the SID is advertised in exchange 44 between TWAMP server 38 and TWAMP control client 32 via control connection 42. The SID is then included in the TWAMP test packets exchanged for data session 50. In this way, the SID is exchanged in a periodic fashion across both control connection 42 and data session 50, and ensures that the control-side of TWAMP maintains control over the proceedings of the data-side of TWAMP.

The SID may act as an implicit field for authenticating TWAMP session sender 34. In other words, the SID field may perform the same function over data session 50 that it does over control connection 42, thus extending its usage across two connection channels. The SID helps the TWAMP session reflector 40 to adjust and adapt to a NATTED environment in which the identify of TWAMP session sender 34 is changed. The SID included in the TWAMP control messages and data messages enables TWAMP session reflector 40 to authenticate data session 50 and TWAMP session sender 34 based on the SID.

An example process of how the SID is exchanged for control connection 42 and data session 50 is described by the following sequence of events.

(1) TWAMP control client 32 and TWAMP server 38 perform exchange 44 of the SID for data session 50 as part of the exchange of parameters during data session negotiation over control connection 42 between the two endpoints. TWAMP server 38 is the initiator or generator of the SID. TWAMP server 38 may generate the unique number for use as the SID based on the source address for the data session, e.g., the IP address of first network device 28, or the destination address for the data session, e.g., the IP address of the second network device 30, or some combination of the two. In other examples, TWAMP server 38 may generate the unique number for use as the SID based, at least in part, on a random number generator. For example, the SID may comprise a 16-bit value including at least a portion of each of the source address and the destination address for the data session, and a random number. In some examples, the SID may be a 16 bit, random Hex field.

(2) During negotiation of data session 50, TWAMP server 38 may communicate the SID of data session 50 to TWAMP session reflector 40 via communication link 48 before data session 50 starts. In addition, TWAMP control client 32 may communicate the SID of data session 50 to TWAMP session sender 34 via communication link 46 before data session 50 starts. In some examples, TWAMP sever 38 or TWAMP session reflector 40 may store the SID of data session 50 in a table that includes a plurality of SIDs assigned to different data sessions. In addition, TWAMP control client 32 or TWAMP session sender 34 may also store the SID of data session 50 in a table that includes a plurality of SIDs assigned to different data sessions.

(3) Starting with the first test packet for data session 50, TWAMP session sender 34 includes the corresponding SID in every test packet. As described herein, the SID included in the test packets and will serve to authenticate data session 50 and identifying TWAMP session sender 34 to TWAMP session reflector 40. TWAMP session reflector 40 identifies data session 50 corresponding to the received test packets based on the SID, and includes the SID in every test packet reflected back to TWAMP session sender 34 carrying metrics for network performance measurements.

Figure 6A:
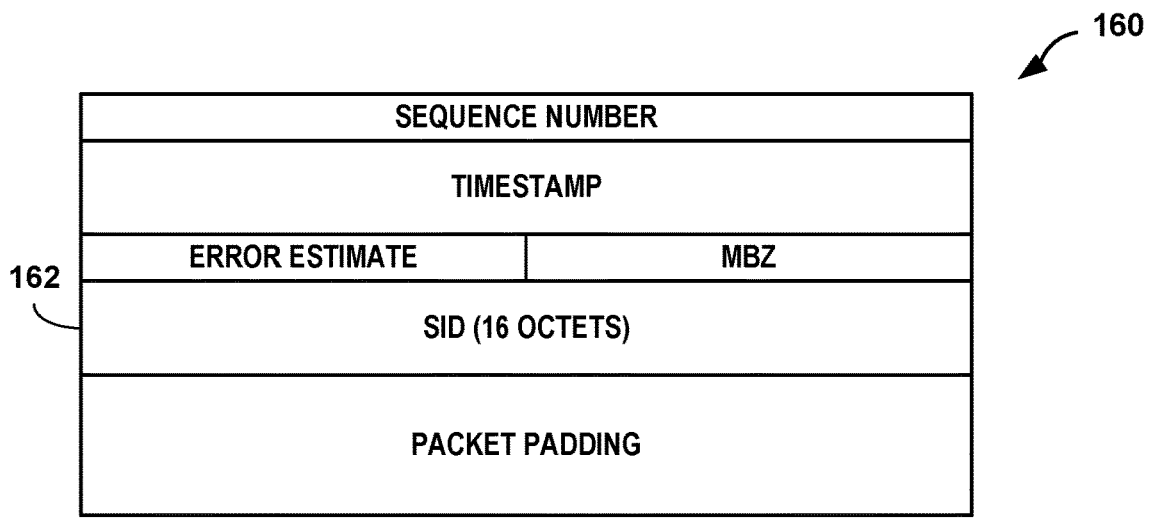
FIGS. 6A-6B are conceptual diagrams illustrating example formats of TWAMP test packets for a SID-based TWAMP data session between a TWAMP session sender and a TWAMP session reflector, in accordance with the techniques of this disclosure.
Figure 6B:
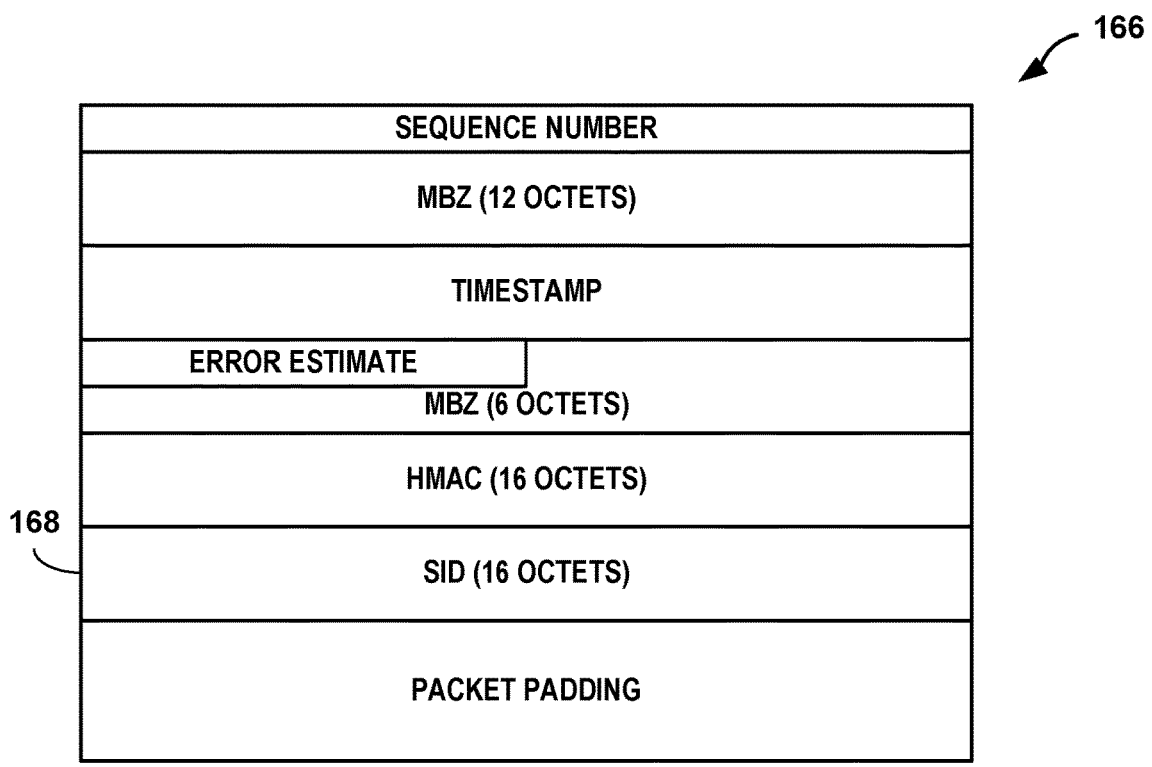

An example message sequence for establishing the control connection and provisioning the SID-based data session is described in detail below with respect to FIG. 3. Examples of TWAMP test packet formats that include the SID are illustrated in FIGS. 6A-6B.

In the example illustrated in FIG. 2, first network device 28 executes both TWAMP control client 32 and WAMP session sender 34, and second network device 30 executes both TWAMP server 38 and TWAMP session-reflector 40. In other examples, each of a TWAMP control client, a TWAMP session sender, a TWAMP server, and a TWAMP session reflector may be executed on separate hosts. In this example, the TWAMP control client and the TWAMP server establish a control connection, and the TWAMP control client may instruct the TWAMP session sender to negotiate a data session with the TWAMP session reflector. Once the TWAMP control client starts the data session, the TWAMP session sender sends the TWAMP test packets including the SID to the TWAMP session reflector over the data session, and receives the TWAMP test packets back from the TWAMP session reflector including the SID and one or more metrics for the data session. The TWAMP session sender may then send the received metrics to the TWAMP control client to compute the network performance measurements between the host of the TWAMP session sender and the host of the TWAMP session reflector.

Figure 3:
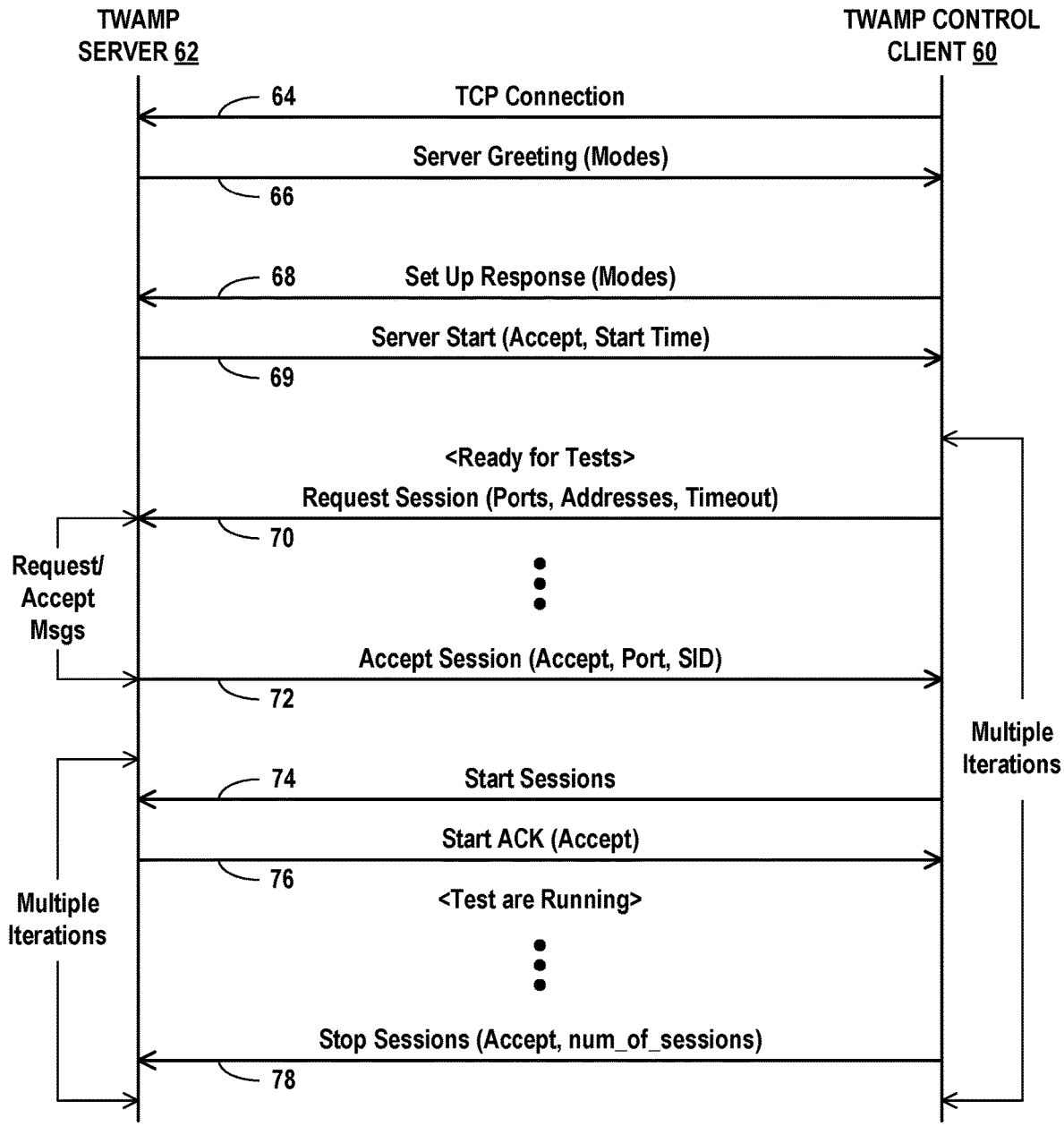
FIG. 3 is a block diagram illustrating an example message sequence between a TWAMP control client and a TWAMP server, in accordance with the techniques of this disclosure.

FIG. 3 is a block diagram illustrating an example message sequence between a TWAMP control client 60 and TWAMP server 62, in accordance with the techniques of this disclosure. In some scenarios, TWAMP control client 60 may operate substantially similar to TWAMP control client 32 executed on first network device 28 from FIG. 2, and TWAMP server 62 may operate substantially similar to TWAMP server 38 executed on second network device 30 from FIG. 2. The TWAMP extensions described in this disclosure include modifications to existing control messaging between TWAMP control client 60 and TWAMP server 62, and modifications to existing data messaging between a TWAMP session sender associated with TWAMP control client 60 and a TWAMP session reflector associated with TWAMP server 62. The modification to the TWAMP data messaging is described in more detail below with respect to FIGS. 6A-6B and FIG. 8.

As illustrated in FIG. 3, TWAMP control client 60 and TWAMP server 62 exchange a first set of control messages to establish a control connection. In the illustrated example, the first set of control messages includes a transmission control protocol (TCP) connection 64, a server greeting message 66, a set up response message 68, and a server start message 69. In other examples, the first set of control messages may include more or fewer control messages that may convey similar or different control information to establish the control connection.

According to the disclosed techniques, the first set of control messages may be modified to include a communication mode indicating whether SID-based data sessions are supported. For example, TWAMP control client 60 on a first network device initiates TCP connection 64 with TWAMP server 62 on a second network device. In response, TWAMP server 62 sends server greeting message 66 to TWAMP control client 60 identifying a plurality of communication modes that are supported by TWAMP server 62, including one mode that indicates that SID-based TWAMP data sessions are supported by TWAMP server 62.

Server greeting message 66 may include a modes field used to indicate which communication modes are supported by TWAMP server 62. For example, the modes field may be used to identify and select specific communication capabilities. In accordance with the disclosed techniques, at least one bit position within the modes field of server greeting message 66 may be used to indicate whether the TWAMP server supports SID-based data sessions. In one example, a $4^{th}$ bit in the modes field of service greeting message 66 may be used to indicate whether TWAMP server 62 supports SID-based data sessions. Conventionally, the modes field may have any of the following values: 1: unauthenticated, 3: unauthenticated+authenticated, or 7: unauthenticated+authenticated+encrypted. With TWAMP extensions to support SID-based data session provisioning, the modes field may have the following value: 8: supports SID-based data sessions.

TWAMP control client 60 selects one or more of the communication modes identified in server greeting message 66 received from TWAMP server 62 and that are also supported by TWAMP control client 60. TWAMP control client 60 then sends set up response message 68 to TWAMP server 62 identifying the selected communication modes, including the one mode that indicates that SID-based TWAMP data sessions are supported by TWAMP control client 60. Set up response message 68 may include a modes field used to indicate the selected communication modes that are supported by both TWAMP control client 60 and TWAMP server 62. For example, the modes field may be used to identify and select specific communication capabilities. With the TWAMP extensions to support SID-based data sessions, if TWAMP control client 60 wants to participate in SID-based data session provisioning, the modes field included in set up response message 68 may have the following value: 8: supports SID-based data sessions. TWAMP server 62 responds with server start message 69 to accept the selected communication mode and give its start time, which completes the setup of the control connection.

TWAMP control client 60 and TWAMP server 62 then exchange a second set of control messages to negotiate one or more data sessions. In some examples, each of the one or more data sessions may be associated with a different network service supported at TWAMP server 62. In other examples, each of the one or more data session may be associated with a different network performance metric between the TWAMP session sender and the TWAMP session reflector. In the illustrated example, the second set of control messages includes a plurality of request session messages 70 and accept session messages 72, one pair for each of the one or more data sessions. In other examples, the second set of control messages may include more or fewer control messages that may convey similar or different control information to negotiate data sessions.

According to the disclosed techniques, the second set of control messages may be modified to negotiate a SID used to uniquely identify each of the data sessions. For example, TWAMP control client 60 sends a request session message 70 requesting a data session over the control connection to TWAMP server 62. Request session message 70 may describe the requested data session in terms of its source and destination address, its source and destination ports, and its timeout. In response to the data session request, TWAMP server 62 assigns a unique number as the SID to identify the data session. TWAMP server 62 then sends an accept session message 72 over the control connection to TWAMP control client 60 accepting the data session and port, and including the SID of the data session. The TWAMP extensions for the second set of control messages between TWAMP control client 60 and TWAMP server 62 are described in more detail below with respect to FIG. 8.

TWAMP control client 60 and TWAMP server 62 may also exchange a third set of control messages to manage or control the one or more data sessions between the TWAMP session sender and the TWAMP session reflector. In the illustrated example, the third set of control messages includes a start sessions message 74, a start acknowledgment (ACK) message 76, and a stop sessions message 78. In other examples, the third set of control messages may include more or fewer control messages that may convey similar or different control information to manage the data sessions.

In response to receiving one or more accept session messages 72 for the one or more data sessions, TWAMP control client 60 sends start sessions message 74 to TWAMP server 62 to initiate testing on all the requested data sessions. TWAMP server 62 responds with ACK message 76, which indicates the start of the one or more data sessions. The TWAMP session sender and the TWAMP session reflector then exchange test packets for each of the active data sessions. According to the disclosed techniques, the test packets exchanged for a particular data session are modified to carry the SID of the particular data session in order to identify the particular data session of the test packets. The TWAMP extensions to the test packets exchanged between the TWAMP session sender associated with TWAMP control client 60 and the TWAMP session reflector associated with TWAMP server 62 are described in more detail below with respect to FIGS. 6A-6B. At some point in the future, TWAMP control client 60 may send stop sessions message 78 to TWAMP server 62 to stop testing on all the data sessions.

Figure 4:
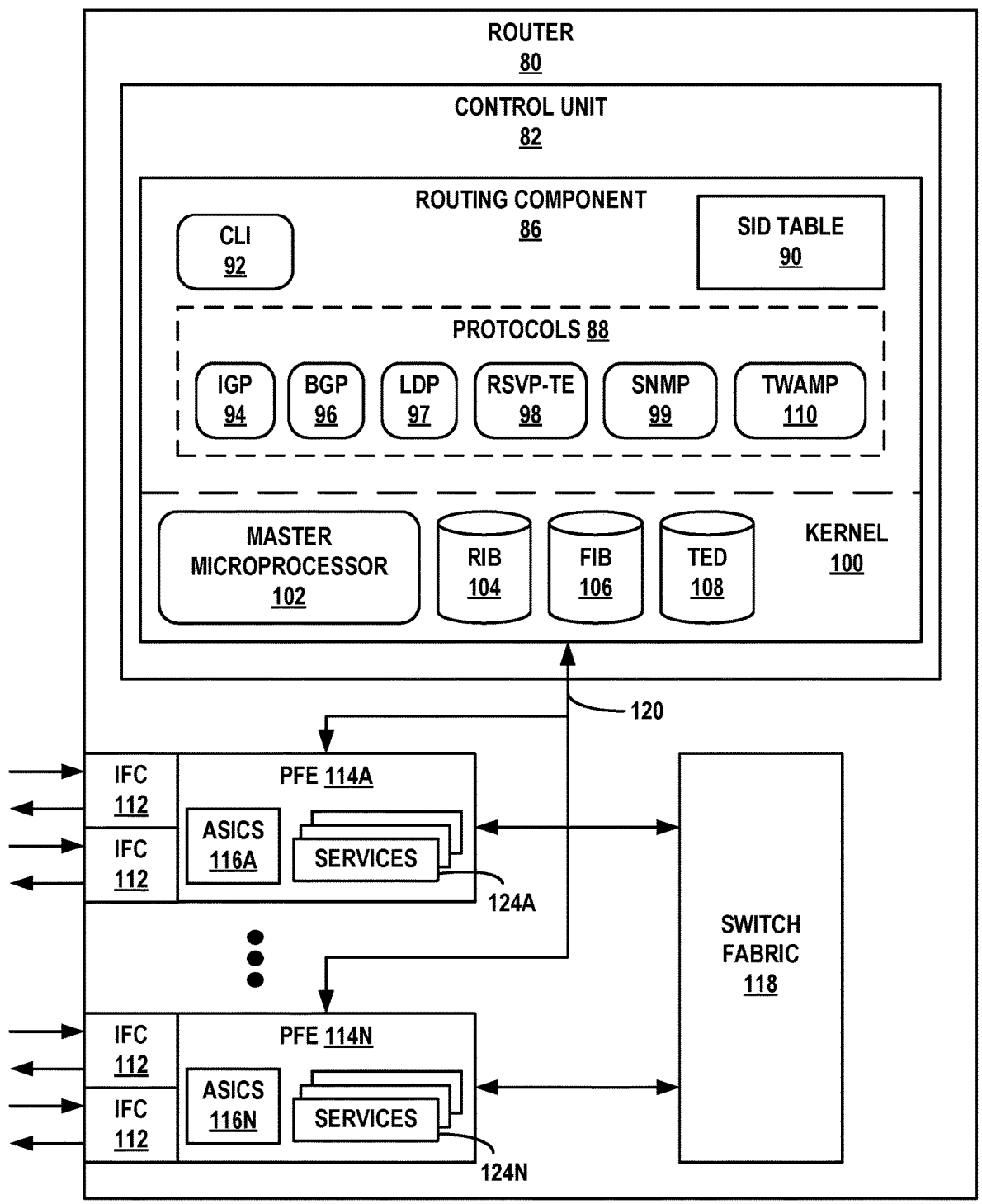
FIG. 4 is a block diagram illustrating an example router configured to execute one or more TWAMP logical roles, in accordance with the techniques of this disclosure.

FIG. 4 is a block diagram illustrating an example router 80 configured to execute one or more TWAMP logical roles, in accordance with the techniques of this disclosure. Router 80 may be described herein within the context of service provider network 2 of FIG. 1, and may represent any of router 18 or router 8, for example. Moreover, while described with respect to a particular network device, e.g., a router, the techniques may be implemented by any network device that may operate as a service endpoint, such as a Layer 3 (L3) or L2/L3 switch or server.

In the example of FIG. 4, router 80 includes control unit 82 in which routing component 86 provides control plane functionality for router 80. Router 80 also includes a plurality of packet-forwarding engines 114A-114N ("PFEs 114") and a switch fabric 118 that collectively provide a data plane for forwarding network traffic. PFEs 114 receive and send data packets via interface cards 112 ("IFCs 112"). In other examples, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 120 may comprise a Gigabit Ethernet connection. Switch fabric 118 provides a highspeed interconnect for forwarding incoming data packets between PFEs 114 for transmission over a network.

Routing component 86 provides an operating environment for execution of various protocols 88 that may comprise software processes having instructions executed by a computing environment. As described in further detail below, protocols 88 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of router 80 using text-based commands. Simple Network Management Protocol daemon 99 ("SNMP 99") comprises an SNMP agent that receives SNMP commands from a management entity, such as SDN controller 14 (FIG. 1), to set and retrieve configuration and management information for router 80. Using CLI 92 and SNMP 99, one or more management entities may enable/disable and configure services, install routes, enable/disable and configure rate limiters and configure interfaces, for example.

One or more routing protocols, such as IGP 94 or BGP 96, maintain routing information in the form of routing information base (RIB) 104 that describes a topology of a network, and derives a forwarding information base (FIB) 106 in accordance with the routing information. In general, the routing information represents the overall topology of the network. IGP 94 and BGP 96 can interact with kernel 101 (e.g., by way of API calls) to update RIB 104 based on routing protocol messages received by router 80. RIB 104 may include information defining a topology of a network, including one or more routing tables and/or link-state databases.

Typically, the routing information defines routes (i.e., series of next hops) through a network to destinations/prefixes within the network learned via a distance-vector routing protocol (e.g., BGP 96) or defines the network topology with interconnected links learned using a link state routing protocol (e.g., IS-IS or OSPF) of IGP 94. In contrast, FIB 106 is generated based on selection of certain routes within the network and maps packet key information (e.g., destination information and other select information from a packet header) to one or more specific next hops and ultimately to one or more specific output interface ports of IFCs 112.

Routing component 86 also provides an operating environment of one or more traffic engineering protocols to establish tunnels for forwarding subscriber packets through the ordered set of service nodes 10 associated with different service chains. For example, Resource Reservation Protocol with Traffic Engineering extensions (RSVP-TE) 98 may exchange traffic engineering information, such as NIPLS labels for enabling label-based packet forwarding. As another example, routing component 86 may use GRE or IP-based tunneling protocols (not shown) to establish traffic engineered tunnels. Routing component 86 may maintain, for example, a traffic engineering database (TED) 109 to store the traffic engineering data. Protocols 88 can also include label distribution protocol (LDP) 97.

Routing component 86 provides an operating environment of TWAMP 110. For example, routing component 86 may use TWAMP 110 to execute one or more TWAMP logical roles, such as a TWAMP control client, a TWAMP server, a TWAMP sessions sender, and a TWAMP session reflector. According to the techniques described in this disclosure, TWAMP 110 may be extended to enable SID-based TWAMP data session provisioning between two endpoints in a computer network. For purposes of illustration, router 80 is described herein as a first endpoint configured to execute a TWAMP control client and/or an associated TWAMP session sender.

The disclosed techniques include extending control messaging of TWAMP 110 to include a communication mode for the SID-based TWAMP data session provisioning. In this way, when operating as the TWAMP control client, router 80 is configured to negotiate support for SID-based data sessions during establishment of the control connection with a TWAMP server executed on another endpoint, e.g., service node 10A from FIG. 1.

During negotiation of a particular data session, router 80, operating as the TWAMP control client, receives a SID of the particular data session, the SID being a unique number assigned to the particular data session by the TWAMP server. Router 80 may then store the SID of the particular data session in a SID table 90. SID table 90 may include a plurality of SIDS corresponding to a plurality of different data sessions. In some examples, each of the different data sessions may be associated with a different network service supported at the TWAMP server. In other examples, each of the different data sessions may be associated with a different network performance metric to be measured.

Router 80, operating as the TWAMP control client, may also communicate the SID of the particular data session directly to the associated TWAMP session sender over a communication link. In some examples, routing component 86 may execute both the TWAMP control client and the TWAMP session sender such that the communication is an internal control communication between the TWAMP logical roles on routing component 86. In this case, either the TWAMP control client or the TWAMP session sender may be responsible for maintaining SID table 90.

The disclosed techniques further include extending data messaging of TWAMP 110 to include a SID assigned to a data session in each test packet for the data session. In this way, when operating as the TWAMP session sender, router 80 is configured to include the SID of the particular data session in each TWAMP test packet for the particular data session that is sent to a TWAMP session reflector executed on another endpoint, e.g., service node 10A from FIG. 1. In addition, when operating as the TWAMP session sender, router 80 is configured to associate received test packets with the particular data session based on the SID included in the received test packets from the TWAMP session reflector. For example, the TWAMP session sender may compare the SID included in the received TWAMP test packets to SID table 90 in order to identify the corresponding data session. In this way, router 80 may identify a data session corresponding to one or more received TWAMP test packets based on a SID included in the TWAMP test packets, instead of using source and destination address/port pairs in the five-tuple of the test packets for identification purposes.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of router 80. In some instances, routing component 86 may derive separate and different software FIBs for each respective PFEs 114. In addition, one or more of PFEs 114 include application-specific integrated circuits (ASICs 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 98 to generate forwarding information in the form of FIB 106 based on the network topology represented in RIB 104, i.e., kernel 101 performs route resolution and path selection. Typically, kernel 101 generates FIB 106 in the form of radix or other lookup trees to map packet information (e.g., header information having destination information and/or a label stack) to next hops and ultimately to interface ports of IFCs 112 associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of router 80. Operations may be performed, for example, on each packet based on any of a corresponding ingress interface, an ingress PFE 114, an egress PFE 114, an egress interface or other components of router 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the manner in which a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each of a plurality of services 124A-214N (collectively "services 124"). In some examples, each of services 124 may comprise a single service, a service chain, or a service path. For example, ASICs 116 may be configured with forwarding information that specifies traffic engineering information, such as IP header information or MPLS labels, as well as operations for causing programmable ASICs 116 to encapsulate subscriber packets in accordance with the forwarding information. In this way, ASICs 116 may process subscriber packets to select particular service paths 124 for each packet and encapsulate the subscriber packets in accordance with the selected service paths 124. Routing component 86 may generate RIB 104 and FIB 106 to associate subscriber packet flows with particular service paths 124 based on one or more service profiles associated with each subscriber, as may be received from an AAA server, a policy controller, a SDN controller or another network element.

The architecture of router 80 illustrated in FIG. 4 is shown for example purposes only. This disclosure is not limited to this architecture. In other examples, router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an ASIC, a FPGA, or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 5:
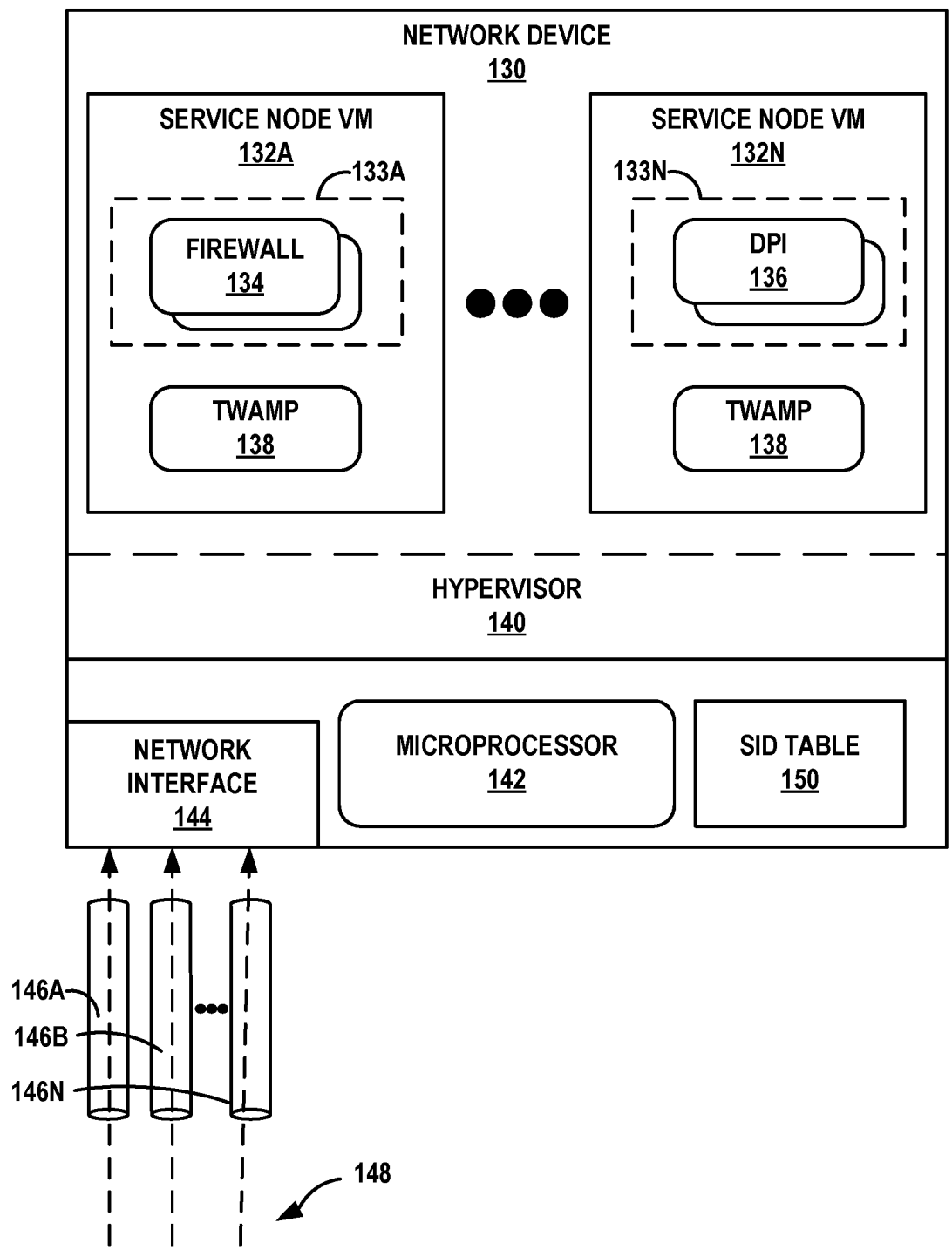
FIG. 5 is a block diagram illustrating an example network device configured to execute one or more TWAMP logical roles, in accordance with the techniques of this disclosure.

FIG. 5 is a block diagram illustrating an example network device 130 configured to execute one or more TWAMP logical roles, in accordance with the techniques of this disclosure. Network device 130 may be described within the context of service provider network 2 of FIG. 1, and may represent any of router 8, router 18, service nodes 10, or data center 9, for example. In other examples, network device 130 may comprise any network device, such as a router, a switch or a server, within service provider network 2.

In the example of FIG. 5, network device 130 includes a microprocessor 142 executing hypervisor 140 to provide an execution environment for one or more service node virtual machines (VMs) 132A-132N (collectively "service node VMs 132"). Each of service node VMs 132 executes network services applications 133A-133N (collectively "network service applications 133"), such as stateful firewall 134 and deep packet inspection (DPI) 136, to apply stateful network services to packet flows.

As illustrated in FIG. 5, each of service node VMs 132 also provides an operating environment for TWAMP 138. For example, each of service node VMs 132 may use TWAMP 138 to execute one or more TWAMP logical roles, such as a TWAMP control client, a TWAMP server, a TWAMP sessions sender, and a TWAMP session reflector. In other examples, the one or more TWAMP logical roles may be executed on a physical chassis of network device 130. According to the techniques described in this disclosure, TWAMP 138 may be extended to enable SID-based TWAMP data session provisioning between two endpoints in a computer network. For purposes of illustration, service node VM 132A is described herein as a second endpoint configured to execute a TWAMP server and/or an associated TWAMP session reflector.

The disclosed techniques include extending control messaging of TWAMP 138 to include a communication mode for the SID-based TWAMP data session provisioning. In this way, when operating as the TWAMP server, service node VM 132A is configured to negotiate support for SID-based data sessions during establishment of the control connection with a TWAMP control client executed on another endpoint, e.g., router 8 from FIG. 1.

During negotiation of a particular data session, service node VM 132A, operating as the TWAMP server, receives a request for a particular data session from the TWAMP control client, and assigns a unique number as a SID of the particular data session. In some examples, the TWAMP server may generate the unique number for use as the SID based on a source address for the particular data session or a destination address for the particular data session, or some combination of the two. The source address may be the IP address of a first endpoint executing the TWAMP session sender, e.g., router 8 from FIG. 1. The destination address may be the IP address of a second endpoint executing the TWAMP session reflector, e.g., service node VM 132A. In other examples, the TWAMP server may generate the unique number for use as the SID based, at least in part, on a random number generator. For example, the SID may comprise a 16-bit value including at least a portion of each of the source address and the destination address for the data session, and a random number.

Service node VM 132A may then store the SID of the particular data session in a SID table 150. SID table 150 may include a plurality of SIDs corresponding to a plurality of different data sessions. In some examples, each of the different data sessions may be associated with a different network service supported at the TWAMP server. In other examples, each of the different data sessions may be associated with a different network performance metric to be measured.

Service node VM 132A, operating as the TWAMP server, may also communicate the SID of the particular data session directly to the associated TWAMP session reflector over a communication link. In some examples, service node VM 132A may execute both the TWAMP server and the TWAMP session reflector such that the communication is an internal control communication between the TWAMP logical roles on service node VM 132A. In this case, either the TWAMP server or the TWAMP session reflector may be responsible for maintaining SID table 150.

The disclosed techniques further include extending data messaging of TWAMP 138 to include a SID assigned to a data session in each test packet for the data session. For example, the data messages may include a field specifying the SID. In this way, when operating as the TWAMP session reflector, service node VM 132A is configured to include the SID of the particular data session in each TWAMP test packet for the particular data session that is reflected back to a TWAMP session sender executed on another endpoint, e.g., router 8 from FIG. 1. In addition, when operating as the TWAMP session reflector, service node VM 132A is configured to identify the particular data session corresponding to the received TWAMP test packets based on the SID included in the received test packets from the TWAMP session sender. For example, the TWAMP session reflector may compare the SID included in the received TWAMP test packets to SID table 150 in order to identify the corresponding data session. In this way, service node VM 132A may identify a data session corresponding to one or more received TWAMP test packets based on a SID included in the TWAMP test packets, instead of using source and destination address/port pairs in the five-tuple of the test packets for identification purposes.

In the example illustrated in FIG. 5, network device 130 includes a network interface 144 to receive tunnel packets 148 over a plurality of tunnels 146A-146N ("tunnels 146"). Each of the tunnels 146 corresponds to a different one of a plurality of service chains, where each of the service chains comprises a different ordered set of one or more stateful network services to be applied to packet flows associated with subscribers. Each of the tunnel packets 148 encapsulates a subscriber packet. In some cases, the subscriber packet may be a TWAMP test packet injected by a TWAMP session sender associated with a TWAMP control client. The architecture of network device 130 illustrated in FIG. 5 is shown for example purposes only. This disclosure is not limited to this architecture. In other examples, network device 130 may be configured in a variety of ways.

FIGS. 6A-6B are conceptual diagrams illustrating example formats of TWAMP test packets for a SID-based TWAMP data session between a TWAMP session sender and a TWAMP session reflector, in accordance with the techniques of this disclosure. The TWAMP test packets may be exchanged to collect metrics used to measure network performance between a first network device executing the TWAMP session sender and a second network device executing the TWAMP session reflector.

The techniques described in this disclosure include extensions to the TWAMP test packets to include a SID used to identify the data session. According to the disclosed techniques, a SID is assigned to each data session during negotiation as a unique number used to identify the data session, and each TWAMP test packet carries the SID assigned to the data session of the TWAMP test packet. The techniques described herein may avoid certain issues that may occur in TWAMP systems that only use a combination of a source and destination address/port pairs included in five-tuple of a TWAMP test packet to identify the data session of the test packet. For example, the techniques described in this disclosure can be used in networks having source NAT implementations, because the SID is not among the parameters that are translated in the network address translation so an endpoint receiving test packets can still use the SID to identify the data session even after the test packets have undergone NAT. As another example, the number of data sessions that can be used between two endpoints may be larger or even unlimited, because the number of unique SIDs is not constrained by a number of ports available for use between the two endpoints.

FIG. 6A illustrates an example format 160 of a TWAMP test packet for a data session in an unauthenticated mode. The illustrated test packet format 160 may represent a TWAMP test packet sent in either direction, i.e., from a TWAMP session sender to a TWAMP session reflector or from a TWAMP session reflector back to a TWAMP session sender.

As illustrated in FIG. 6A, test packet format 160 includes several fields, including a sequence number field, a timestamp field, an error estimate field, a must-be-zero (MBZ) field, a SID field 162, and packet padding. As part of the disclosed TWAMP extensions, test packet format 160 includes a 16-octet SID field 162, as illustrated in FIG. 6A, to carry the SID of the data session for which the test packet is being transmitted. For example, the SID may comprise a 16-bit value including at least a portion of each of a source IP address for the data session, a destination IP address for the data session, and a random number. The octet number included SID field 162 is merely an example. In other examples, the number of octets for SID field 162 may be different than indicated in FIG. 6A.

FIG. 6B illustrates an example format 166 of a TWAMP test packet for a data session in authenticated and encrypted modes. The illustrated test packet format 166 may represent a TWAMP test packet sent in either direction, i.e., from a TWAMP session sender to a TWAMP session reflector or from a TWAMP session reflector back to a TWAMP session sender.

As illustrated in FIG. 6B, test packet format 166 includes several fields, including a sequence number field, a timestamp field, an error estimate field, a hash-based message authentication code (HMAC) field, several MBZ fields, a SID field 168, and packet padding. As part of the disclosed TWAMP extensions, test packet format 166 includes a 16-octet SID field 168, as illustrated in FIG. 6B, to carry the SID of the data session for which the test packet is being transmitted. For example, the SID may comprise a 16-bit value including at least a portion of each of a source IP address for the data session, a destination IP address for the data session, and a random number. The octet numbers included in test packet format 166, including SID field 168, are merely examples. In other examples, the number of octets for each of the fields may be different than those included in FIG. 6B.

Figure 7:
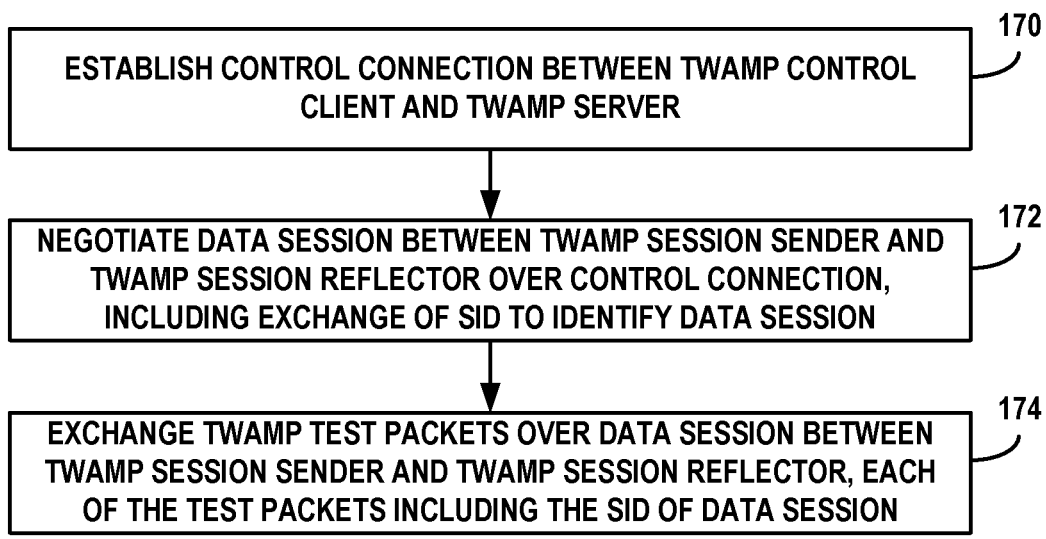
FIG. 7 is a flowchart illustrating an example operation of negotiating a SID-based TWAMP data session, in accordance with the techniques of this disclosure.

FIG. 7 is a flowchart illustrating an example operation of negotiating a SID-based TWAMP data session, in accordance with the techniques of this disclosure. The example operation of FIG. 7 is described with respect to TWAMP control client 32 and TWAMP session sender 34 executed on first network device 28, and TWAMP server 38 and TWAMP session reflector 40 executed on second network device 30 from FIG. 2. In other examples, the operation illustrated in FIG. 7 may be performed by a TWAMP control client, a TWAMP session sender, a TWAMP server, and a TWAMP session reflector that are each executed on separate hosts.

TWAMP control client 32 on first network device 28 and TWAMP server 38 on second network device 30 establish control connection 42 (170). When establishing control connection 42, TWAMP control client 32 and TWAMP server 36 may negotiate communication and security options for future data sessions established by TWAMP control client 32 and TWAMP server 36. According to the techniques of this disclosure, TWAMP server 38 identifies a plurality of supported communication modes, one of which indicates that SID-based TWAMP data sessions are supported by TWAMP server 38. TWAMP control client 32 then determines which of the plurality of supported communication modes are also supported by TWAMP control client 32, and selects at least one of the communication modes for the future data sessions. According to the disclosed techniques, the selected one of the communication modes indicates that SID-based TWAMP data sessions are supported by both TWAMP control client 32 and TWAMP server 38.

TWAMP control client 32 and TWAMP server 38 then use control connection 42 to negotiate a data session, e.g., data session 50, between TWAMP session sender 34 and TWAMP session reflector 40, the negotiation including the exchange 44 of the SID assigned by TWAMP server 38 to identify data session 50 (172). To negotiate the data session, TWAMP control client 32 requests data session 50 from TWAMP server 38, and TWAMP server 38 responds with its acceptance of data session 50 and supporting information, including the SID of data session 50.

In accordance with the techniques of this disclosure, TWAMP server 38 assigns a unique number as the SID to identify data session 50. In some examples, TWAMP server 38 may generate the unique number for use as the SID based on the source address for the data session, e.g., the IP address of the first network device 28 executing TWAMP session sender 34, or the destination address for the data session, e.g., the IP address of the second network device 30 executing TWAMP session reflector 40, or some combination of the two. In other examples, TWAMP server 38 may generate the unique number for use as the SID based, at least in part, on a random number generator. For example, the SID may comprise a 16-bit value including at least a portion of each of the source address and the destination address for the data session, and a random number. In some cases, TWAMP server 38 may assign a new SID to identify data session 50 either after a set period of time or after a predetermined number of TWAMP test packets have been sent for data session 50. Periodically changing the SID of data session 50 may improve security and avoid "man-in-the-middle" attacks.

In some examples, TWAMP server 38 may communicate the SID of data session 50 to TWAMP session reflector 40 via communication link 48 before data session 50 starts. In addition, TWAMP control client 32 may communicate the SID of data session 50 to TWAMP session sender 34 via communication link 46 before data session 50 starts. TWAMP sever 38 or TWAMP session reflector 40 may store the SID of data session 50 in a table that includes a plurality of SIDs assigned to different data sessions, e.g., SID table 150 of network device 130 from FIG. 5. In addition, TWAMP control client 32 or TWAMP session sender 34 may also store the SID of data session 50 in a table that includes a plurality of SIDs assigned to different data sessions, e.g., SID table 90 of router 80 from FIG. 4.

Once TWAMP control client 32 starts data session 50, TWAMP session sender 34 and TWAMP session reflector 40 exchange one or more TWAMP test packets for data session 50 with each of the one or more TWAMP test packets including the SID of data session 50 (174). In addition to the SID, each of the TWAMP test packets may include at least one metric for data session 50 used to measure network performance between first network device 28 and second network device 30. According to the disclosed techniques, TWAMP session sender 34 and TWAMP session reflector 40 use the SID included in the TWAMP test packets to identify data session 50 of the TWAMP test packets, instead of identifying the data session based on a source address and/or a source port of the TWAMP test packets.

Figure 8:
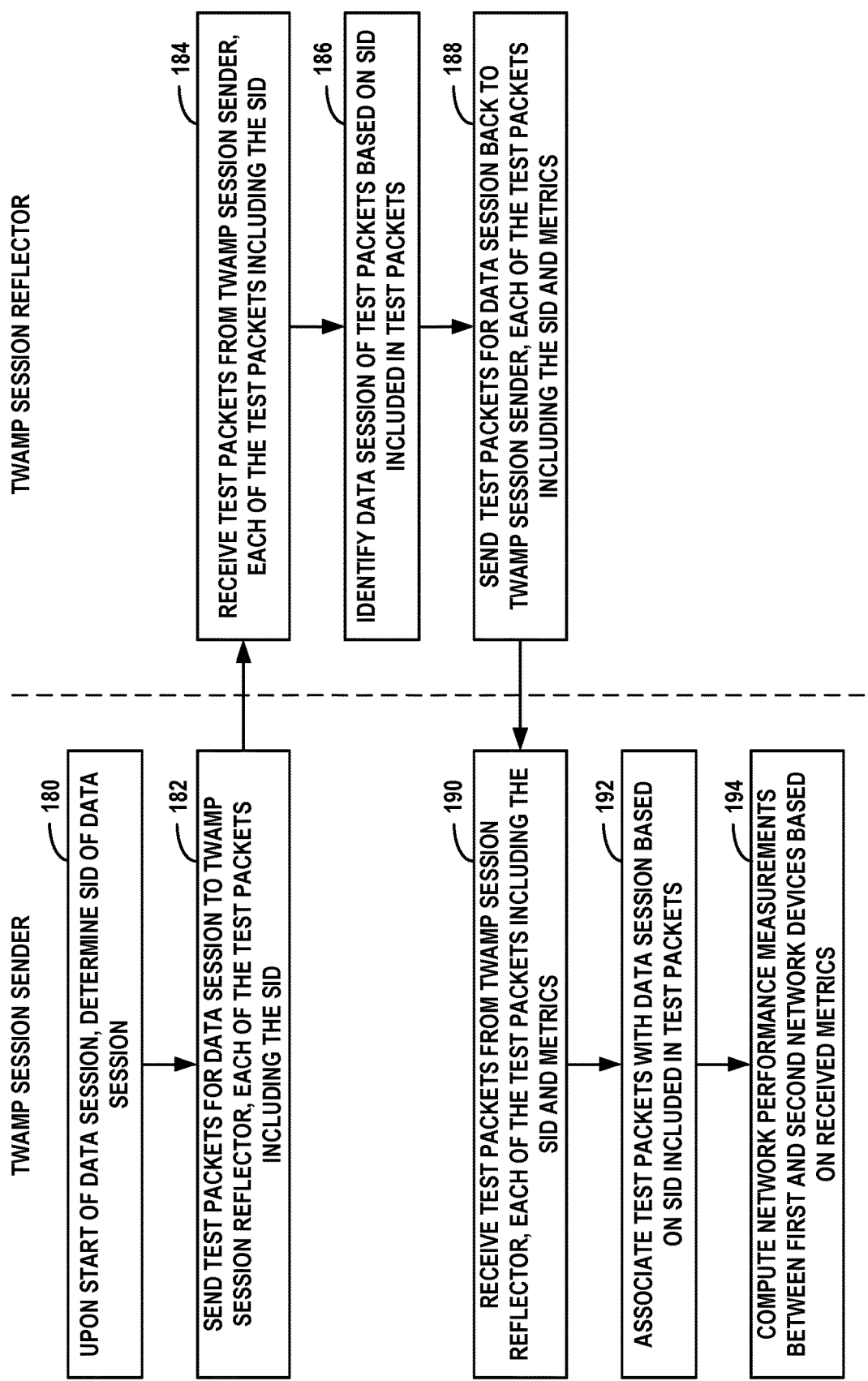
FIG. 8 is a flowchart illustrating an example operation of exchanging TWAMP test packets for a SID-based TWAMP data session between a TWAMP session sender executed on a first network device and a TWAMP session reflector executed on a second network device, in accordance with the techniques of this disclosure.

FIG. 8 is a flowchart illustrating an example operation of exchanging TWAMP test packets for a SID-based TWAMP data session between a TWAMP session sender executed on a first network device and a TWAMP session reflector executed on a second network device, in accordance with the techniques of this disclosure. The example operation of FIG. 8 is described with respect to TWAMP session sender 34 executed on first network device 28, and TWAMP session reflector 40 executed on second network device 30 from FIG. 2.

As described in detail above, TWAMP control client 32 and TWAMP server 38 may establish control connection 42, and negotiate data session 50 including exchange 44 of the SID of data session 50. Once TWAMP control client 32 starts data session 50, TWAMP session sender 34 determines the SID of data session 50 (180). In one example, TWAMP session sender 34 may determine the SID of data session 50 from a SID table maintained by either TWAMP control client 32 or TWAMP session sender 34, e.g., SID table 90 from FIG. 4. In another example, TWAMP session sender 34 may learn the SID of data session 50 directly from TWAMP control client 32 via communication link 46 from FIG. 2. TWAMP session sender 34 then sends one or more TWAMP test packets for data session 50 to TWAMP session reflector 40 with each of the TWAMP test packets including the SID of data session 50 (182).

TWAMP session reflector 40 receives the TWAMP test packets from TWAMP session sender 34 with each of the TWAMP test packets including the SID (184). In response to receiving the TWAMP test packets, TWAMP session reflector 40 identifies data session 50 of the received TWAMP test packets based on the SID included in the TWAMP test packets (186). In one example, TWAMP session reflector 40 may identify data session 50 using a SID table maintained by either TWAMP server 38 or TWAMP session reflector 40, e.g., SID table 150 from FIG. 5. For example, TWAMP session reflector 40 may compare the SID included in the received TWAMP test packets to the plurality of SIDS assigned to different data sessions included in the SID table in order to identify data session 50. In this way, TWAMP session reflector 40 uses the SID to identify data session 50 for which the TWAMP test packets are received, instead of identifying the data session based on a source address and/or a source port of the TWAMP test packets.

TWAMP session reflector 40 then sends the TWAMP test packets for data session 50 back to TWAMP session sender 34 with each of the TWAMP test packets including the SID of data session 50 and one or more metrics for data session 50 used to measure network performance between first network device 28 and second network device 30 (188). For example, the metrics may include timestamps for sending or receiving a test packet, error estimates for sending or receiving the test packet, a sequence number for sending the test packet, a TTL value for the test packet, a keepalive PDU, and/or a count of serviced packets, bytes, or subscribers.

TWAMP session sender 34 receives the TWAMP test packets from TWAMP session reflector 40 with each of the TWAMP test packets including the SID and the metrics (190). Upon receiving the TWAMP test packets from TWAMP session reflector 40, TWAMP session sender 32 associates the received TWAMP test packets with data session 50 based on the SID included in the TWAMP test packets (192). For example, TWAMP session sender 34 may compare the SID included in the received TWAMP test packets to the plurality of SIDs assigned to different data sessions included in the SID table maintained by TWAMP control client 32 or TWAMP session sender 34 in order to identify data session 50. In this way, TWAMP session sender 34 uses the SID to identify data session 50 for which the TWAMP test packets are received, instead of identifying the data session based on a source address and/or a source port of the TWAMP test packets.

TWAMP control client 32, or some other module executed by first network device 28, may then compute network performance measurements between first network device 28 and second network device 30 based on the received metrics for data session 50 (194). For example, TWAMP control client 32 may compute one or more of keepalive or path connectivity measurements, RTT measurements, path delay measurements, packet jitter measurements, packet re-ordering measurements, packet loss measurements, service latency measurements, or service load measurements based on the received metrics.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include RAM, ROM, PROM, EPROM, EEPROM, flash memory, a hard disk, a CD-ROM, a floppy disk, a cassette, magnetic media, optical media, or another computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
   establishing a control connection between a two-way active measurement protocol (TWAMP) control client and a TWAMP server, wherein establishing the control connection includes exchanging indications that session identifier (SID)-based data sessions are supported by both the TWAMP control client and the TWAMP server;
   negotiating, by the TWAMP control client and the TWAMP server over the control connection, a data session between a TWAMP session sender executed on a first network device and a TWAMP session reflector executed on a second network device, wherein negotiating the data session includes exchanging a SID assigned by the TWAMP server to identify the data session; and
   exchanging one or more TWAMP test packets for the data session between the TWAMP session sender and the TWAMP session reflector, each of the one or more TWAMP test packets including the SID of the data session and at least one metric for the data session identified by the SID used to measure network performance between the first network device and the second network device.

2. The method of claim 1, further comprising assigning, by the TWAMP server, a unique number as the SID of the data session, wherein the unique number is generated based on at least one of a source address for the data session, a destination address for the data session, or a random number generator.

3. The method of claim 1, further comprising assigning, by the TWAMP server, a new SID to identify the same data session after a set period of time or after a predetermined number of TWAMP test packets have been sent for the data session.

4. The method of claim 1, further comprising storing the SID of the data session in a data structure including a plurality of SIDs uniquely assigned to different data sessions.

5. The method of claim 1, wherein establishing the control connection comprises:
   sending, by the TWAMP server and to the TWAMP control client, a greeting message that identifies a plurality of communication modes that are supported by the TWAMP server, wherein one of the plurality of communication modes indicates that the SID-based data sessions are supported by the TWAMP server; and
   receiving, by the TWAMP server and from the TWAMP control client, a set up message that identifies at least one of the plurality of communication modes that is also supported by the TWAMP control client, wherein the at least one of the plurality of communication modes indicates that the SID-based data sessions are supported by the TWAMP control client.

6. The method of claim 1, wherein establishing the control connection comprises:
   receiving, by the TWAMP control client and from the TWAMP server, a greeting message that identifies a plurality of communication modes that are supported by the TWAMP server, wherein one of the plurality of communication modes indicates that the SID-based data sessions are supported by the TWAMP server;
   selecting, by the TWAMP control client, at least one of the plurality of communication modes that is also supported by the TWAMP control client; and
   sending, by the TWAMP control client and to the TWAMP server, a set up message that identifies the at least one of the plurality of communication modes, wherein the at least one of the plurality of communication modes indicates that the SID-based data sessions are supported by the TWAMP control client.

7. The method of claim 1, wherein exchanging the one or more TWAMP test packets for the data session comprises:
   receiving, by the TWAMP session reflector, the one or more TWAMP test packets for the data session from the TWAMP session sender, each of the one or more TWAMP test packets including the SID of the data session;
   identifying, by the TWAMP session reflector, the data session of the one or more TWAMP test packets based on the SID included in the one or more TWAMP test packets; and
   sending, by the TWAMP session reflector, the one or more TWAMP test packets back to the TWAMP session sender, each of the one or more TWAMP test packets including the SID of the data session and the at least one metric for the data session identified by the SID used to measure the network performance between the first network device and the second network device.

8. The method of claim 1, wherein exchanging the one or more TWAMP test packets for the data session comprises:
   sending, by the TWAMP session sender, the one or more TWAMP test packets for the data session to the TWAMP session reflector, each of the one or more TWAMP test packets including the SID of the data session;
   receiving, by the TWAMP session sender, the one or more TWAMP test packets back from the TWAMP session reflector, each of the one or more TWAMP test packets including the SID of the data session and the at least one metric for the data session identified by the SID used to measure the network performance between the first network device and the second network device; and
   associating, by the TWAMP session sender, the one or more TWAMP test packets with the data session based on the SID included in the one or more TWAMP test packets.

9. A network device comprising:
   a memory; and
   one or more processors in communication with the memory and executing a two-way active measurement protocol (TWAMP) control client and a TWAMP session sender, the one or more processors configured to:
     establish a control connection between the TWAMP control client and a TWAMP server, wherein, to establish the control connection, the one or more processors are configured to exchange indications that session identifier (SID)-based data sessions are supported by both the TWAMP control client and the TWAMP server;
     negotiate, over the control connection, a data session between the TWAMP session sender and a TWAMP session reflector executed on another network device, wherein, to negotiate the data session, the one or more processors are configured to exchange a SID assigned by the TWAMP server to identify the data session; and send one or more TWAMP test packets for the data session from the TWAMP session sender to the TWAMP session reflector, each of the one or more TWAMP test packets including the SID of the data session, to measure network performance between the network device and the another network device according to at least one metric for the data session identified by the SID.

10. The network device of claim 9, wherein the one or more processors are configured to, in response to sending the one or more TWAMP test packets:
receive the one or more TWAMP test packets back from the TWAMP session reflector, each of the one or more TWAMP test packets including the SID of the data session and the at least one metric for the data session identified by the SID used to measure the network performance between the network device and the another network device; and
associate the one or more TWAMP test packets with the data session based on the SID included in the one or more TWAMP test packets.

11. The network device of claim 9, wherein, to negotiate the data session, the one or more processors are configured to receive a unique number assigned by the TWAMP server as the SID of the data session.

12. The network device of claim 9, wherein the one or more processors are configured to receive a new SID assigned by the TWAMP server to identify the same data session after a set period of time or after a predetermined number of TWAMP test packets have been sent for the data session.

13. The network device of claim 9, wherein the one or more processors are configured to store the SID of the data session in a data structure including a plurality of SIDs uniquely assigned to different data sessions.

14. The network device of claim 9, wherein, to establish the control connection, the one or more processors are configured to:
receive a greeting message from the TWAMP server that identifies a plurality of communication modes that are supported by the TWAMP server, wherein one of the plurality of communication modes indicates that the SID-based data sessions are supported by the TWAMP server;
select at least one of the plurality of communication modes that is also supported by the TWAMP control client; and
send a set up message to the TWAMP server that identifies the at least one of the plurality of communication modes, wherein the at least one of the plurality of communication modes indicates that the SID-based data sessions are supported by the TWAMP control client.

15. A network device comprising:
a memory; and
one or more processors in communication with the memory and executing a two-way active measurement protocol (TWAMP) server and a TWAMP session reflector, the one or more processors configured to:
establish a control connection between the TWAMP server and a TWAMP control client, wherein, to establish the control connection, the one or more processors are configured to exchange indications that session identifier (SID)-based data sessions are supported by both the TWAMP control client and the TWAMP server;
negotiate, over the control connection, a data session between the TWAMP session reflector and a TWAMP session sender executed on another network device, wherein, to negotiate the data session, the one or more processors are configured to exchange a SID assigned by the TWAMP server to identify the data session; and
receive one or more TWAMP test packets for the data session by the TWAMP session reflector from the TWAMP session sender, each of the one or more TWAMP test packets including the SID of the data session, to measure network performance between the network device and the another network device according to at least one metric for the data session identified by the SID.

16. The network device of claim 15, wherein the one or more processors are configured to, upon receipt of the one or more TWAMP test packets:
identify the data session of the one or more TWAMP test packets based on the SID included in the one or more TWAMP test packets; and
send the one or more TWAMP test packets from the TWAMP session reflector back to the TWAMP session sender, each of the one or more TWAMP test packets including the SID of the data session and the at least one metric for the data session identified by the SID used to measure the network performance between the network device and the another network device.

17. The network device of claim 15, wherein the one or more processors are configured to assign a unique number as the SID of the data session, wherein the unique number is generated based on at least one of a source address for the data session, a destination address for the data session, or a random number generator.

18. The network device of claim 15, wherein the one or more processors are configured to assign a new SID to identify the same data session after a set period of time or after a predetermined number of TWAMP test packets have been sent for the data session.

19. The network device of claim 15, wherein the one or more processors are configured to store the SID of the data session in a data structure including a plurality of SIDs uniquely assigned to different data sessions.

20. The network device of claim 15, wherein, to establish the control connection, the one or more processors are configured to:
send a greeting message to the TWAMP control client that identifies a plurality of communication modes that are supported by the TWAMP server, wherein one of the plurality of communication modes indicates that the SID-based data sessions are supported by the TWAMP server; and
receive a set up message from the TWAMP control client that identifies at least one of the plurality of communication modes that is also supported by the TWAMP control client, wherein the at least one of the plurality of communication modes indicates that the SID-based data sessions are supported by the TWAMP control client.

* * * * *